United States Patent
Cho (10) Patent No.: US 11,999,325 B2
(45) Date of Patent: Jun. 4, 2024

(54) FRICTION MEMBER AND MASTER CYLINDER COMPRISING SAME

(71) Applicant: HL MANDO CORPORATION, Pyeongtaek-si (KR)

(72) Inventor: Joo Un Cho, Suwon-si (KR)

(73) Assignee: HL MANDO CORPORATION, Pyeongtaek (KR)

( * ) Notice: Subject to any disclaimer, the term of this patent is extended or adjusted under 35 U.S.C. 154(b) by 305 days.

(21) Appl. No.: 17/287,624

(22) PCT Filed: Oct. 23, 2019

(86) PCT No.: PCT/KR2019/013978
§ 371 (c)(1),
(2) Date: Apr. 22, 2021

(87) PCT Pub. No.: WO2020/085792
PCT Pub. Date: Apr. 30, 2020

(65) Prior Publication Data
US 2021/0394730 A1    Dec. 23, 2021

(30) Foreign Application Priority Data
Oct. 23, 2018  (KR) .................. 10-2018-0126888

(51) Int. Cl.
*B60T 11/16*     (2006.01)
*F16F 7/09*      (2006.01)
*B60T 8/40*      (2006.01)

(52) U.S. Cl.
CPC .............. *B60T 11/165* (2013.01); *F16F 7/09* (2013.01); *B60T 8/4081* (2013.01)

(58) Field of Classification Search
CPC ...... B60T 8/4081; B60T 8/4086; B60T 8/409; B60T 11/165; F16F 7/09
See application file for complete search history.

(56) References Cited

U.S. PATENT DOCUMENTS 2,808,302 A * 10/1957 Bowerman ........... F04B 53/143
                                              92/244
2004/0206081 A1  10/2004 Bourlon et al.
2005/0066656 A1   3/2005 Ogiwara et al.

FOREIGN PATENT DOCUMENTS

CN      1293320 A    5/2001
CN    101124111 A    2/2008
(Continued)

OTHER PUBLICATIONS

International Search Report issued in International Application No. PCT/KR2019/013978 dated Feb. 26, 2020.
(Continued)

*Primary Examiner* — Kenneth Bomberg
*Assistant Examiner* — Daniel S Collins
(74) *Attorney, Agent, or Firm* — Harvest IP Law, LLP (57) ABSTRACT

The present disclosure relates to a friction member and a master cylinder including the same. The master cylinder includes a cylinder body with a bore formed therein, a piston configured to move forward and backward in the bore and protrude a portion thereof from the cylinder body, a housing configured to surround the protruding portion of the piston and having a through hole formed therein such that an input rod connected to a brake pedal to press the piston is inserted, a friction member provided between the housing and the piston to increase a frictional force with the piston when the piston moves forward and backward, and a pedal simulator connected to the piston to provide a repulsive force to the brake pedal.

13 Claims, 6 Drawing Sheets

(56) References Cited

FOREIGN PATENT DOCUMENTS

| | | | | |
|---|---|---|---|---|
| CN | 201496553 | U | * | 6/2010 |
| CN | 202827546 | U | | 3/2013 |
| CN | 103359094 | A | | 10/2013 |
| CN | 104249722 | A | | 12/2014 |
| CN | 107614335 | A | | 1/2018 |
| GB | 575417 | A | | 2/1946 |
| GB | 1122701 | A | | 8/1968 |
| JP | 10-95328 | A | | 4/1998 |
| JP | 2002-139076 | A | | 5/2002 |
| JP | 2005-104333 | A | | 4/2005 |
| JP | 2009-143254 | A | | 7/2009 |
| JP | 2015-009705 | A | | 1/2015 |
| JP | 2015-202780 | A | | 11/2015 |
| KR | 10-2004-0006919 | A | | 1/2004 |
| KR | 10-2004-0031849 | A | | 4/2004 |
| KR | 10-0483152 | B1 | | 4/2005 |
| KR | 10-0779484 | B1 | | 11/2007 |
| KR | 10-2018-0034315 | A | | 4/2018 |
| KR | 10-2019-0046501 | A | | 5/2019 |

OTHER PUBLICATIONS

Office Action issued in corresponding Chinese Patent Application No. 201980069709.8, dated Mar. 11, 2022.
Office Action issued in corresponding Korean application 10-2018-0126888 dated Mar. 6, 2023 with English Translation.

* cited by examiner

FRICTION MEMBER AND MASTER CYLINDER COMPRISING SAME

CROSS-REFERENCE OF RELATED APPLICATIONS

This application is the U.S. National Phase under 35 U.S.C. § 371 of International Patent Application No. PCT/KR2019/013978, filed on Oct. 23, 2019, which claims the benefit of Korean Patent Application No. 10-2018-0126888, filed on Oct. 23, 2018, the entire disclosures of each are incorporated by reference herein.

TECHNICAL FIELD

The present disclosure relates to a friction member and a master cylinder including the same, and more particularly, to a friction member capable of improving a pedal feel and reducing noise during operation of a brake pedal, and a master cylinder including the same.

BACKGROUND ART

In general, a vehicle is provided with a brake actuator unit (BAU) for electronically controlling a braking hydraulic pressure transmitted to a caliper brake mounted on each wheel.

The brake actuator unit includes a master cylinder for generating a hydraulic pressure, a reservoir for supplying oil to the master cylinder, a valve block for controlling a hydraulic flow generated from the master cylinder, and an electronic control unit (ECU) for electrically controlling the valve block. Such the brake actuator unit is mounted on a vehicle and performs a braking action by providing the hydraulic pressure to a caliper brake installed on each wheel.

The master cylinder of the brake actuator unit is configured to generate a hydraulic pressure as a piston provided in a cylinder body (valve block) to be movable forward and backward is pressurized by a pedal effort of a brake pedal.

More specifically, the master cylinder includes a first piston and a second piston installed in series to be movable forward and backward in a bore of the cylinder body, and the inside of the bore is divided into a first hydraulic chamber and a second hydraulic chamber by the first piston and the second piston, respectively. The master cylinder is mounted on the vehicle through a housing, and the first piston is connected to an input rod coupled with the brake pedal to generate a hydraulic pressure. The housing is provided with a seal member to eliminate an impact sound (hereinafter referred to as 'click noise') caused by coming into contact with the housing when the pressurized first piston returns to an original position thereof.

A separate pedal simulator (also referred to as a pedal feel simulation device) is installed in the brake actuator unit to provide a pedal feel to a driver during braking.

That is, the pedal simulator is connected to the master cylinder to be pressurized by the hydraulic pressure according to the pedal effort of the brake pedal, and is configured to provide a repulsive force to the brake pedal. For example, a pedal simulator for providing a pedal feel is disclosed in Japanese Patent Application Laid-Open No. 2009-227172. According to the disclosed literature, the pedal simulator uses a plurality of springs and a plurality of rubber dampers to provide a reaction force similar to that of a pedal simulator of a conventional hydraulic brake system (CBS).

However, even if the housing is provided with a seal member for relieving an impact sound, click noise may occur because the impact load may not be completely resolved when the pedal effort of the brake pedal is released.

In addition, although the plurality of rubber dampers provided in the pedal simulator have a high contribution to the characteristics according to hysteresis during the pressurization of the brake pedal, because the plurality of rubber dampers has a small hysteresis characteristic in an initial operation period of the brake pedal, the pedal feel may be reduced.

PRIOR TECHNICAL LITERATURE

Patent Literature (Patent Literature) Japanese Patent Application Laid-Open No. 2009-227172 (ADVICS CO LTD) 2009. 10. 08.

DISCLOSURE

Technical Problem

The present disclosure is directed to providing a friction member capable of reducing click noise when a pedal effort of a brake pedal is released and improving a pedal feel by increasing hysteresis during an initial braking period is provided, and a master cylinder including the same.

Technical Solution

An aspect of the present disclosure provides a master cylinder including a cylinder body with a bore formed therein, a piston configured to move forward and backward in the bore and protrude a portion thereof from the cylinder body, a housing configured to surround the protruding portion of the piston and having a through hole formed therein such that an input rod connected to a brake pedal to press the piston is inserted, a friction member provided between the housing and the piston to increase a frictional force with the piston when the piston moves forward and backward, and a pedal simulator connected to the piston to provide a repulsive force to the brake pedal.

The pedal simulator may be hydraulically connected to the bore and provided separately from the bore.

The friction member may include a body part having a hollow portion formed in a longitudinal direction, and an elastic pressing part formed on an inner circumferential surface of the body part and protruding to be in close contact with an outer circumferential surface of the piston.

The elastic pressing part may be configured to have a diameter smaller than a diameter of the piston in a predetermined section.

Another aspect of the present disclosure provides a master cylinder including a cylinder body with a bore formed therein, a piston configured to move forward and backward in the bore and protrude a portion thereof from the cylinder body, a housing installed on the cylinder body to surround a portion of the piston protruding from the cylinder body and having a through hole formed therein such that an input rod connected to a brake pedal to press the piston is inserted, and a friction member provided between the housing and the piston to increase a frictional force with the piston when the piston moves forward and backward.

The friction member may include a body part having a hollow portion formed in a longitudinal direction, and an elastic pressing part formed on an inner circumferential surface of the body part and protruding to be in close contact with an outer circumferential surface of the piston.

The elastic pressing part may be configured to have a diameter smaller than a diameter of the piston in a predetermined section.

The elastic pressing part may be configured such that an inner diameter of the body part gradually decreases in a backward movement direction of the piston.

A chamfer recessed inward from an end of the other side of the elastic pressing part may be provided on the inner circumferential surface of an end of the body part.

A corrugated portion having an uneven shape may be provided on an outer circumferential surface of the body part.

Stoppers may be configured to protrude at a regular interval along an outer circumferential surface of the other side of the body part.

A stopper groove into which each of the stoppers is fitted may be provided at a position corresponding to each of the stoppers in the housing.

Another aspect of the present disclosure provides a friction member, which is provided between a piston protruding from a master cylinder and a housing surrounding the piston, including a body part having a hollow portion formed in a longitudinal direction, and an elastic pressing part protruding toward the piston from an inner circumferential surface of the body part, wherein the elastic pressing part is configured such that an inner diameter of the body part gradually decreases from one side of the body part to the other side.

A chamfer recessed inward from an end of the other side of the elastic pressing part may be provided on the inner circumferential surface of an end of the body part.

A corrugated portion having an uneven shape may be provided on an outer circumferential surface of the body part.

Stoppers may be configured to protrude at a regular interval along an outer circumferential surface of the other side of the body part.

The elastic pressing part may be configured to have a diameter smaller than a diameter of the piston in a predetermined section.

Advantageous Effects

A friction member according to an embodiment of the present disclosure and a master cylinder including the same can improve the characteristics of hysteresis in an initial braking period by increasing a frictional force with a piston operated by the pressurization of a brake pedal, thereby improving a pedal feeling.

Further, when the braking is released, the piston smoothly returns to an original positon thereof as the frictional force with the friction member increases, so that click noise can be minimized.

Further, by using the friction member integrally configured, the part cost and manufacturing cost can be reduced, and the friction member can be provided as an assembly, so that productivity can be improved.

DESCRIPTION OF DRAWINGS

The present disclosure will be described in detail by the drawings below, but since these drawings show preferred embodiments of the present disclosure, the technical idea of the present disclosure should not be construed to be limited only to the drawings.

MODE OF THE DISCLOSURE

Hereinafter, embodiments of the present disclosure will be described in detail with reference to the accompanying drawings. The following embodiments are provided to fully convey the spirit of the present disclosure to a person having ordinary skill in the art to which the present disclosure belongs. The present disclosure is not limited to the embodiments shown herein but may be embodied in other forms. The drawings are not intended to limit the scope of the present disclosure in any way, and the size of components may be exaggerated for clarity of illustration.

Figure 1:
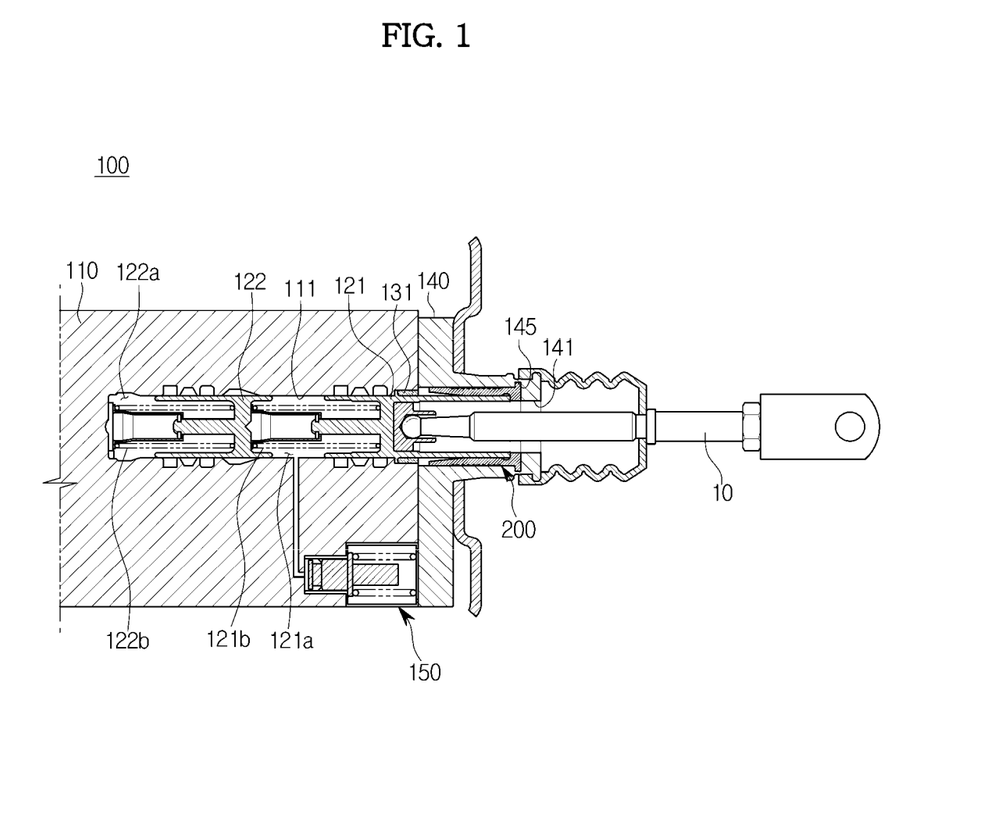
FIG. 1 is a cross-sectional view illustrating a master cylinder provided with a friction member according to an embodiment of the present disclosure.
Figure 2:
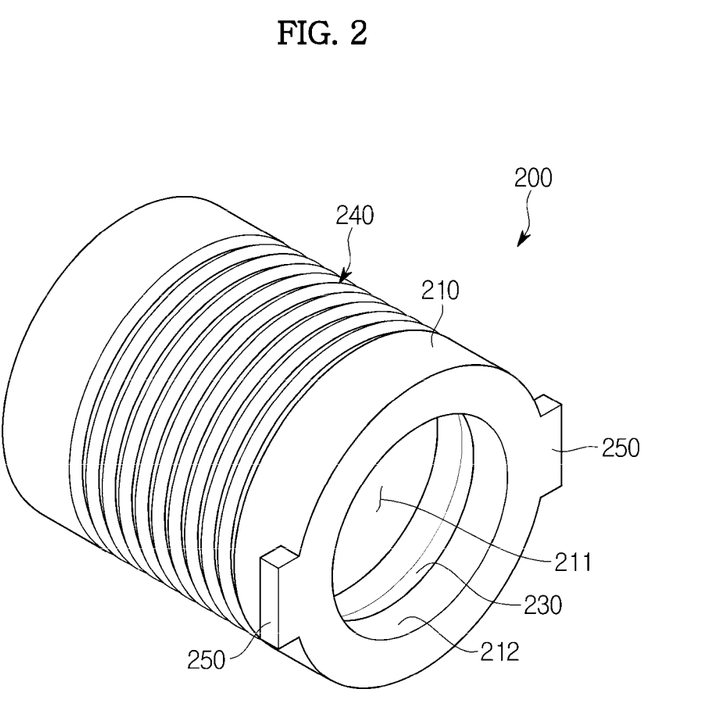
FIG. 2 is a perspective view of the friction member according to an embodiment of the present disclosure.
Figure 3:
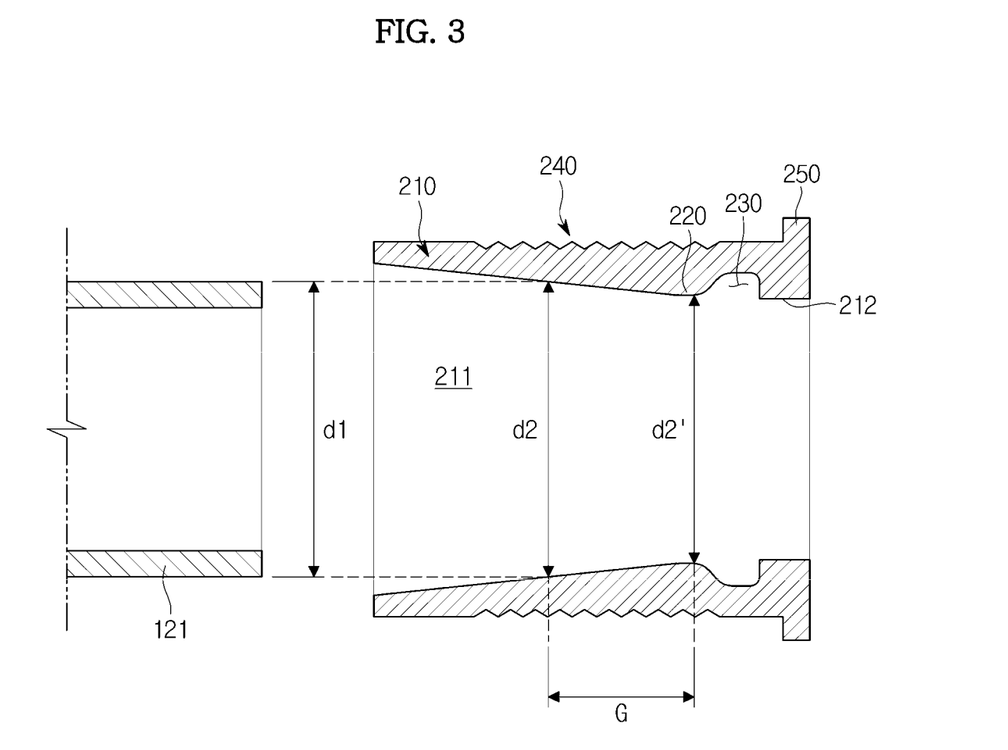
FIG. 3 is a cross-sectional view illustrating a coupling between the friction member and a piston of the master cylinder according to an embodiment of the present disclosure.

FIG. 1 is a cross-sectional view illustrating a master cylinder provided with a friction member according to an embodiment of the present disclosure, FIG. 2 is a perspective view of the friction member according to an embodiment of the present disclosure, and FIG. 3 is a cross-sectional view illustrating a coupling between the friction member and a piston of the master cylinder according to an embodiment of the present disclosure.

Referring to FIGS. 1 to 3, a master cylinder 100 according to an aspect of the present disclosure includes a cylinder body 110 in which a bore 111 is formed, one or more pistons 121 and 122 provided in the bore 111 of the cylinder body 110 to be movable forward and backward, a housing 140 installed on the cylinder body 110, and a friction member 200 installed in the housing 140.

The master cylinder 100 according to an aspect of the present disclosure may also include a pedal simulator 150 connected to the one or more pistons 121 and 122 to provide a repulsive force to a brake pedal (not shown). In this case, the pedal simulator 150 may be hydraulically connected to the bore 111 or one or more hydraulic chambers 121a and 122a, and may be provided in a separate bore (not shown).

The cylinder body 110 is provided with the bore 111 having one open side in a longitudinal direction. The master cylinder 100 may be provided in a valve block of a brake actuator unit that electronically controls a braking hydraulic pressure, and thus the cylinder body 110 may be understood to mean a valve block. The cylinder body 110 as above may be mounted on a vehicle by being coupled to the housing 140.

In the bore 111, the one or more pistons 121 and 122 operated by the operation of an input rod 10 coupled to the brake pedal (not shown) are provided to be movable forward and backward. As illustrated in the drawing, the pistons 121 and 122 may be composed of the first piston 121 and the second piston 122 and may be disposed in series in the bore 111.

Inside the cylinder body 110, the first hydraulic chamber 121a, which is a space in which a hydraulic pressure is formed between the first piston 121 and the second piston 122, is formed, and the second hydraulic chamber 122a, which is a space in which a hydraulic pressure is formed between the second piston 122 and an inner end wall of the bore 111, is formed. A first return spring 121b is provided in the first hydraulic chamber 121a to return the first piston 121 to an original position thereof, and a second return spring 122b is provided in the second hydraulic chamber 122a to return the second piston 122 to an original position thereof.

The first piston 121 is provided such that a portion of the first piston 121 protrudes from the cylinder body 110 through the open bore 111.

The housing 140 is provided to surround the first piston 121 protruding from the cylinder body 110 and installed on the cylinder body 110 to support the cylinder body 110 by being mounted on a vehicle body. A through hole 141 is formed in the housing 140 such that the input rod 10 is connected to the first piston 121 by penetrating the housing 140. A stopper groove 145 is formed in the housing 140 for stable coupling with the friction member 200, which will be described later. A coupling structure of the stopper groove 145 and the friction member 200 will be described later.

Reference numeral '131', which is not described, is a guide bush installed in the bore 111 of the cylinder body 110 to guide the straight movement of the first piston 121.

The friction member 200 according to one aspect of the present disclosure is provided between the housing 140 and the first piston 121 to increase a frictional force with the first piston 121 when the first piston 121 moves forward and backward. The friction member 200 may be provided as an integral type having one body and may be made of a rubber material capable of elastically deformable in order to increase the frictional force with the first piston 121 while maintaining a tight coupling state.

More specifically, the friction member 200 includes a body part 210 having a hollow portion 211 formed therein in the longitudinal direction, and an elastic pressing part 220 provided to protrude from an inner circumferential surface of the body part 210.

The body part 210 is disposed in the housing 140 to surround the first piston 121 protruding from the cylinder body 110. The body part 210 may include a support protrusion 212 formed by being bent such that an end of the body part 210 supports by being in contact with a rear end of the first piston 121 in a state of being interposed between the housing 140 and the first piston 121.

The elastic pressing part 220 may be provided on the inner circumferential surface of the body part 210 to be in close contact with an outer circumferential surface of the first piston 121. For example, the elastic pressing part 220 is provided to elastically press the first piston 121 from a point of coming into contact with the first piston 121 when the first piston 121 moves forward and backward. That is, the elastic pressing part 220 is provided such that a predetermined section G has a diameter (d2~d2') section that is smaller than a diameter d1 of the first piston 121.

More specifically, the elastic pressing part 220 may be provided such that an inner diameter of the body part 210 gradually decreases from one side of the body part 210 toward the other side. That is, the elastic pressing part 220 may be formed to gradually increase in thickness in a backward movement direction of the first piston 121.

Accordingly, as the first piston 121 is elastically pressed by the elastic pressing part 220 in the predetermined section G between a point having the diameter d2 corresponding to the diameter d1 of the first piston 121 and a point having the diameter d2' smaller than the diameter d1 of the first piston 121, the friction force between the first piston 121 and the friction member 200 increases. Therefore, when the first piston 121 returns to the original position, the first piston 121 returns smoothly by the frictional force.

A chamfer 230 recessed inward from the other end of the elastic pressing part 220 may be provided on the inner circumferential surface of the body part 210. As illustrated in the drawing, the chamfer 230 is provided between the elastic pressing part 220 and the support protrusion 212. The chamfer 230 provides a space to facilitate elastic deformation when the elastic pressing part 220 is elastically deformed while coming into contact with the first piston 121.

On an outer circumferential surface of the body part 210, a corrugated portion 240 is formed in a predetermined section. The corrugated portion 240 is formed to have an uneven shape to be in close contact with an inner circumferential surface of the housing 140. Accordingly, auxiliary space portions 242 of a predetermined pattern are formed between the housing 140 and the body part 210 by the corrugated portion 240 having an uneven shape. The elastic pressing part 220 may be easily elastically deformed by the auxiliary space portions 242.

As the friction member 200 is provided in the housing 140 to be in close contact with the first piston 121 as described above, stoppers 250 may be provided on the outer circumferential surface of the body part 210 so that the movement of the friction member 200 is fixed when the first piston 121 moves forward and backward. For example, the stoppers 250 may protrude outward at a predetermined interval along the outer circumferential surface of the body part 210. The drawing illustrates that two of the stoppers 250 are provided to have the same phase difference at the other end of the body part 210, but the present disclosure is not limited thereto. That is, as long as the movement of the friction member 200 may be fixed in the housing 140 when the first piston 121 moves forward and backward, the number of stoppers 250 may selectively increase or decrease, and a shape and location of the stoppers 250 may also be variously changed.

The stopper 250 is fitted into and fixed to the stopper groove 145 formed in the housing 140. The stopper groove 145 may be provided to correspond to the position and shape of the stopper 250.

Hereinafter, the operation of the pistons 121 and 122 of the master cylinder 100, which is provided with the friction member 200 as above, according to a pedal effort of the brake pedal will be described with reference to FIGS. 4 and 5.

Figure 4:
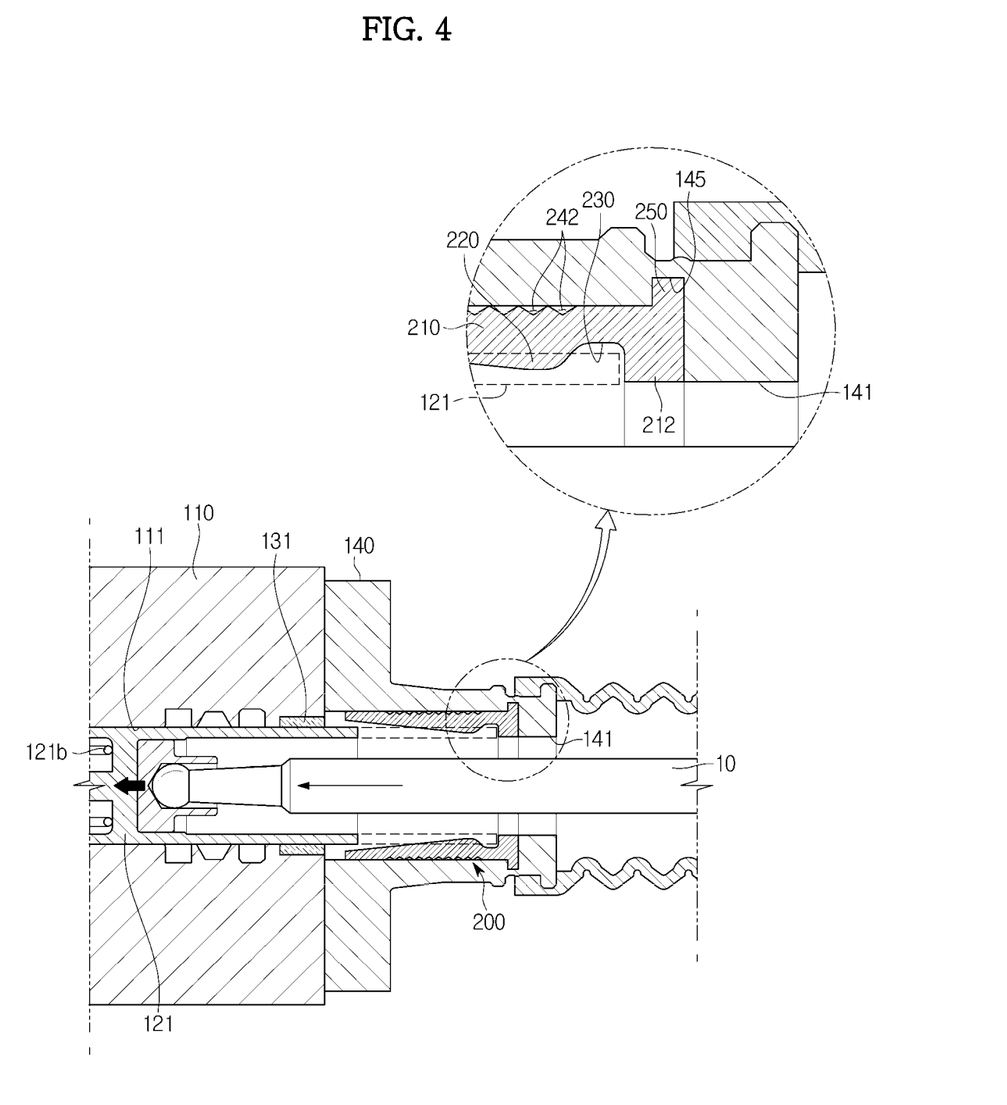
FIG. 4 is a view illustrating that the piston of the master cylinder according to an embodiment of the present disclosure is operated in response to a pedal effort of a brake pedal.

FIG. 4 is a view illustrating that the piston of the master cylinder according to an embodiment of the present disclosure is operated in response to a pedal effort of a brake pedal.

According to an aspect of the present disclosure, as illustrated in FIG. 1, the first piston 121 is pressed by the input rod 10 in response to a pedal effort of the brake pedal (not shown). That is, the first piston 121 moves to the left while pressing the first hydraulic chamber 121a in a state of being in close contact with the friction member 200. Referring to FIGS. 4 and 5, the first piston 121 moves to the left in response to the pedal effort of the brake pedal in the state of being in close contact with the friction member 200 while being elastically pressed by the elastic pressing part 220 of the friction member 200. At this time, the first piston 121 moves in a state in which the frictional force is increased by the elastic pressing part 220, that is, in a state in which the hysteresis characteristics of the initial braking period are improved compared to the prior art. Accordingly, the pedal feel may be improved during the initial operation period of the brake pedal. This hysteresis acts only in the predetermined section G in which a frictional force with the elastic pressing part 220 is generated when the first piston 121 moves, and does not act when the first piston 121 leaves the predetermined section G in which the frictional force with the elastic pressing part 220 is generated.

Thereafter, when the pedal effort of the brake pedal is released, the first piston 121 returns to the original position together with the input rod 10. FIG. 5 is a view illustrating that the piston of the master cylinder according to an embodiment of the present disclosure returns to an original position thereof when the operation of the piston is released.

Figure 5:
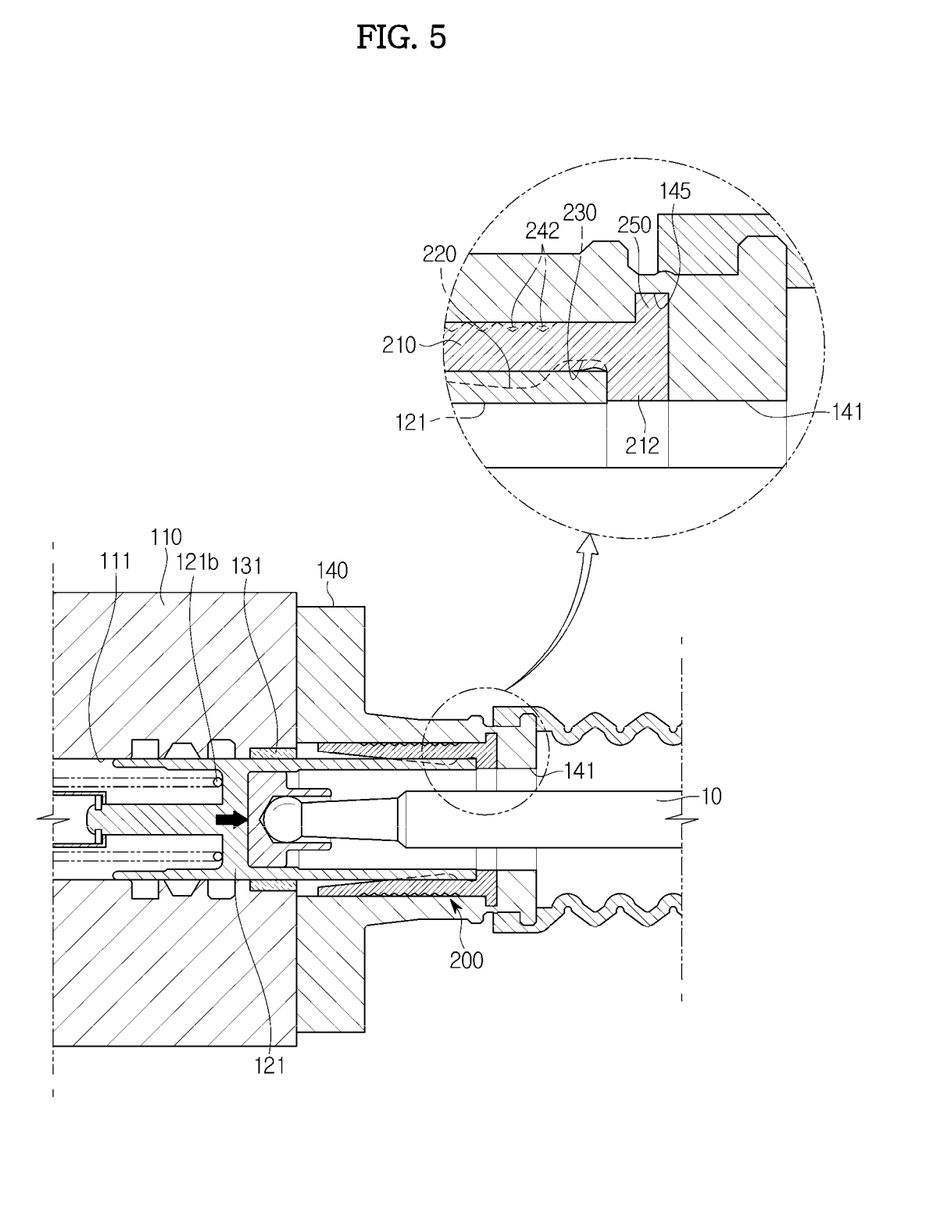
FIG. 5 is a view illustrating that the piston of the master cylinder according to an embodiment of the present disclosure returns to an original position thereof when the operation of the piston is released.

Referring to FIGS. 3 and 5, when the first piston 121 returns to the original position by the first return spring 121b, the frictional force increases from a point in which the first piston 21 comes into contact with the elastic pressing part 220 having the diameter d2 corresponding to the diameter d1 of the first piston 121. That is, as the elastic pressing part 220 is provided such that the diameter (d2~d2') in the predetermined section G is smaller than the diameter d1 of the first piston 121, when the first piston 121 returns, the first piston 121 comes into contact with the elastic pressing part 220, so that the frictional force with the outer circumferential surface of the first piston 121 increases. That is, as the first piston 121 elastically deforms the elastic pressing part 220 upon return, the first piston 121 may return to the original position while moving smoothly, and therefore when the end of the first piston 121 comes into contact with the support protrusion 212 of the friction member 200, click noise may be minimized.

In addition, when the elastic pressing part 220 is elastically deformed upon the return of the first piston 121, the elastic pressing part 220 may be easily deformed by the chamfer 230 formed on the inner circumferential surface of the body part 210 and the auxiliary space portions 242 formed between the corrugated portion 240 and the housing 140.

Figure 6:
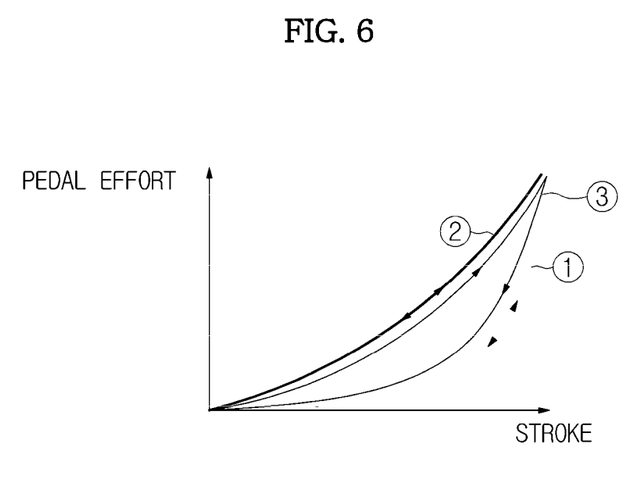
FIG. 6 is a graph for explaining a change in pedal effort in response to a stroke of the brake pedal according to an embodiment of the present disclosure and in the prior art.

FIG. 6 is a graph for explaining a change in pedal effort in response to a stroke of the brake pedal according to an embodiment of the present disclosure and in the prior art.

Hereinafter, a change in pedal effort in response to a change in pedal stroke of a brake (hereinafter, a booster type brake) in which the master cylinder 100 and the wheel cylinder are maintained in a state of being hydraulically connected, a change in pedal effort in response to a change in pedal stroke of a brake (hereinafter, an electronic brake) in which a braking hydraulic pressure is provided to a wheel cylinder (not shown) by a hydraulic pressure providing unit (not shown) provided separately from the master cylinder 100 and a pedal feeling is formed by the pedal simulator 150 will be described with reference to FIG. 6.

Referring to curve ①, in the booster type brake, when braking is performed by the driver, the pedal effort gradually increases as the pedal stroke increases, and when the pedal stroke reaches a certain level or more, the pedal effort increases rapidly. Conversely, when the braking is released, the pedal effort rapidly decreases as the pedal stroke decreases, and when the pedal stroke reaches a certain level or less, the pedal effort gradually decreases.

Referring to curve ②, the conventional electronic brake is provided with a seal member (not shown) positioned at an end of the piston 121 instead of the friction member 200 described above, and when braking is performed, the pedal effort increases almost linearly as the pedal stroke increases. Conversely, when the braking is released, the pedal effort decreases almost linearly as the pedal stroke decreases. At this time, in an initial section of the braking release, the pedal effort may not decreases quickly as the stroke decreases, which causes a bad effect on the pedal feel of the driver.

Referring to curve ③, the electronic brake according to the present disclosure includes the friction member 200 to increase the friction force when the piston 121 moves backward, and when braking is performed, the pedal effort increases almost linearly as the pedal stroke increases, similarly to the curve ② described above. Conversely, when the braking is released, the pedal effort rapidly decreases as the pedal stroke decreases, and when the pedal stroke reaches the certain level or less, the pedal effort gradually decreases. This is because the end of the piston 121 and the elastic pressing part 220 of the friction member 200 are rubbed as the pedal stroke decreases (the piston moves backward) so that pedal effort may rapidly decrease compared to the conventional electronic brake. That is, the master cylinder 100 according to the present disclosure improves the hysteresis characteristics of an initial section in change of pedal effort of the brake pedal by including the friction member 200, thereby improving the pedal feel. In other words, the master cylinder 100 according to the present disclosure may exhibit a performance similar to a change in pedal effort in response to a change in pedal stroke of the booster type brake when the pedal effort is released.

In general, the type, material, gap, etc. of the damper of the pedal simulator 150 forming the pedal feel may be changed in order to adjust the characteristics of the pedal effort of the brake pedal, but the master cylinder 100 according to the present disclosure may adjust the hysteresis characteristics by adjusting characteristics of the friction member 200 as well as the damper of the pedal simulator 150.

The foregoing has illustrated and described specific embodiments. However, it should be understood by those of skilled in the art that the disclosure is not limited to the above-described embodiments, and various changes and modifications may be made without departing from the technical idea of the disclosure described in the following claims.

The invention claimed is:

1. A master cylinder comprising:
   a cylinder body with a bore formed therein;
   a piston configured to move forward and backward in the bore and protrude a portion thereof from the cylinder body;
   a housing configured to surround the protruding portion of the piston and having a through hole formed therein such that an input rod connected to a brake pedal to press the piston is inserted;
   a friction member provided between the housing and the piston to increase a frictional force with the piston when the piston moves forward and backward; and
   a pedal simulator connected to the piston to provide a repulsive force to the brake pedal,
   wherein the friction member comprises:
   a body part having a hollow portion formed in a longitudinal direction; and an elastic pressing part formed on an inner circumferential surface of the body part and protruding to be in close contact with an outer circumferential surface of the piston, and the elastic pressing part and the outer circumferential surface of the piston come into close contact with a larger area when the piston moves backward than when the piston moves forward.

2. The master cylinder according to claim 1, wherein the pedal simulator is hydraulically connected to the bore and provided separately from the bore.

3. The master cylinder according to claim 1, wherein the elastic pressing part is configured to have a diameter smaller than a diameter of the piston in a predetermined section.

4. A master cylinder comprising:
a cylinder body with a bore formed therein;
a piston configured to move forward and backward in the bore and protrude a portion thereof from the cylinder body;
a housing installed on the cylinder body to surround a portion of the piston protruding from the cylinder body and having a through hole formed therein such that an input rod connected to a brake pedal to press the piston is inserted; and
a friction member provided between the housing and the piston to increase a frictional force with the piston when the piston moves forward and backward,
wherein the friction member comprises:
a body part having a hollow portion formed in a longitudinal direction; and
an elastic pressing part formed on an inner circumferential surface of the body part and protruding to be in close contact with an outer circumferential surface of the piston, and
the elastic pressing part is configured such that an inner diameter of the body part gradually decreases in a backward movement direction of the piston.

5. The master cylinder according to claim 4, wherein the elastic pressing part is configured to have a diameter smaller than a diameter of the piston in a predetermined section.

6. The master cylinder according to claim 5, wherein a chamfer recessed inward from an end of the other side of the elastic pressing part is provided on the inner circumferential surface of an end of the body part.

7. The master cylinder according to claim 4, wherein a corrugated portion having an uneven shape is provided on an outer circumferential surface of the body part.

8. The master cylinder according to claim 4, wherein stoppers are configured to protrude at a regular interval along an outer circumferential surface of the other side of the body part.

9. The master cylinder according to claim 8, wherein a stopper groove into which each of the stoppers is fitted is provided at a position corresponding to each of the stoppers in the housing.

10. A friction member, which is provided between a piston protruding from a master cylinder and a housing surrounding the piston, comprising:
a body part having a hollow portion formed in a longitudinal direction; and
an elastic pressing part protruding toward the piston from an inner circumferential surface of the body part,
wherein the elastic pressing part is configured such that an inner diameter of the body part gradually decreases from one side of the body part to the other side,
wherein stoppers are configured to protrude at a regular interval along an outer circumferential surface of the other side of the body part.

11. The friction member according to claim 10, wherein a chamfer recessed inward from an end of the other side of the elastic pressing part is provided on the inner circumferential surface of an end of the body part.

12. The friction member according to claim 10, wherein a corrugated portion having an uneven shape is provided on an outer circumferential surface of the body part.

13. The friction member according to claim 10, wherein the elastic pressing part is configured to have a diameter smaller than a diameter of the piston in a predetermined section.

* * * * *